March 25, 1958 W. S. BABCOCK ET AL 2,828,031
BALE LOADER AND STACKER
Filed March 9, 1956 4 Sheets-Sheet 1

INVENTORS
WILBER S. BABCOCK &
GEORGE W. BABCOCK
BY
McMorrow, Berman + Davidson
ATTORNEYS

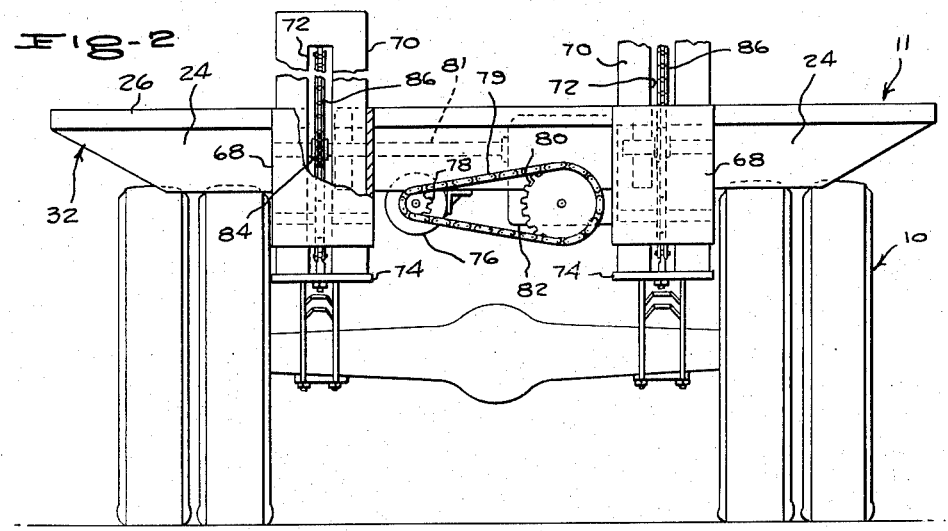
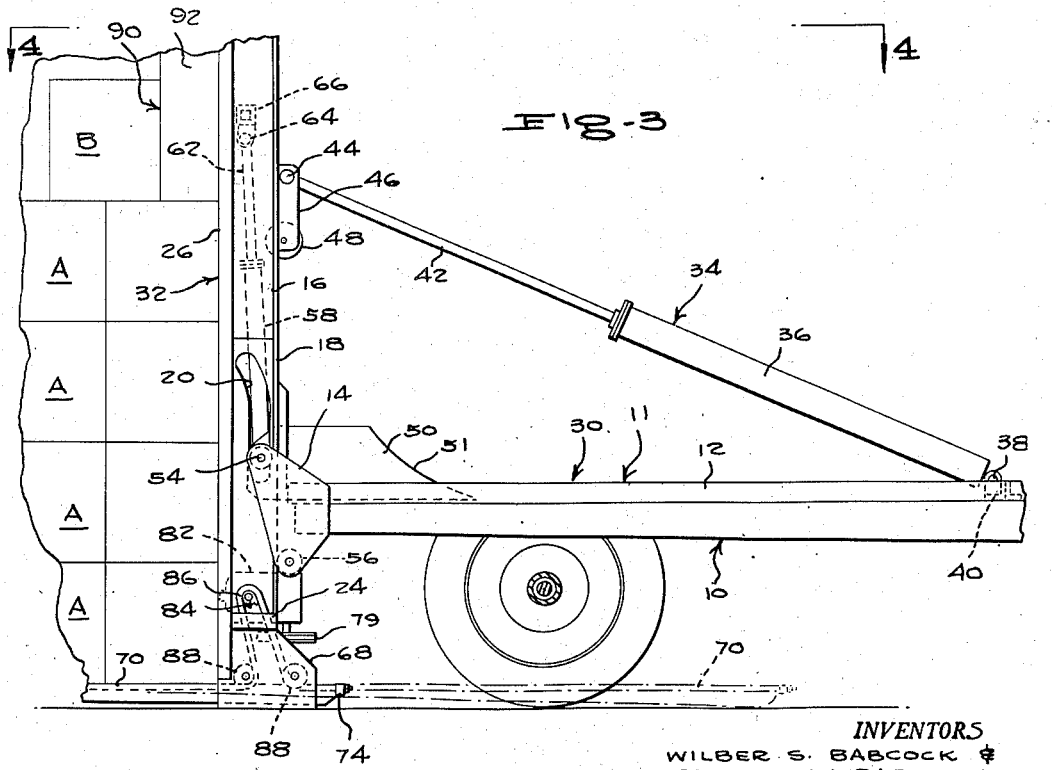

March 25, 1958  W. S. BABCOCK ET AL  2,828,031
BALE LOADER AND STACKER
Filed March 9, 1956  4 Sheets-Sheet 3
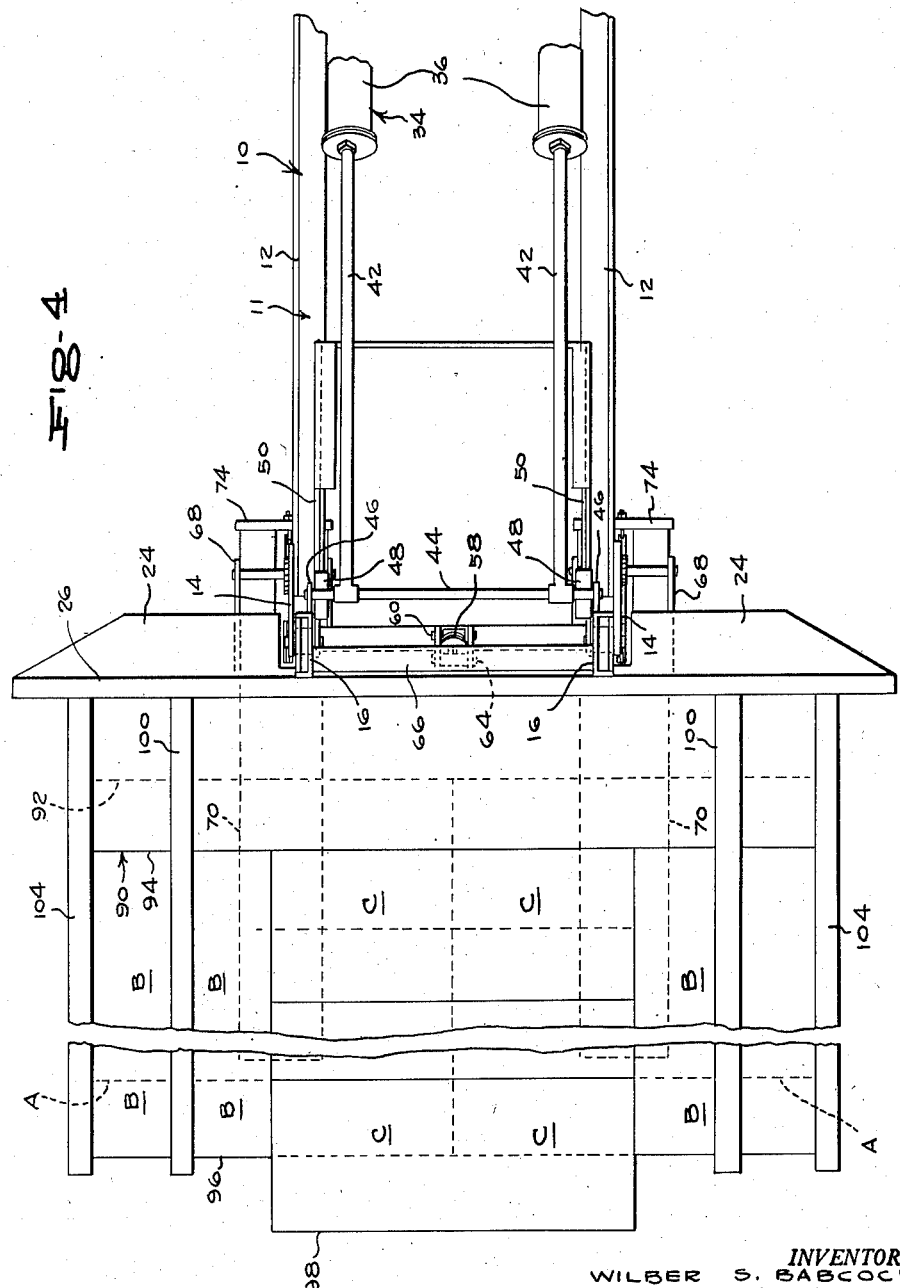
INVENTORS
WILBER S. BABCOCK &
GEORGE W. BABCOCK
BY
McMorrow, Berman & Davidson
ATTORNEYS

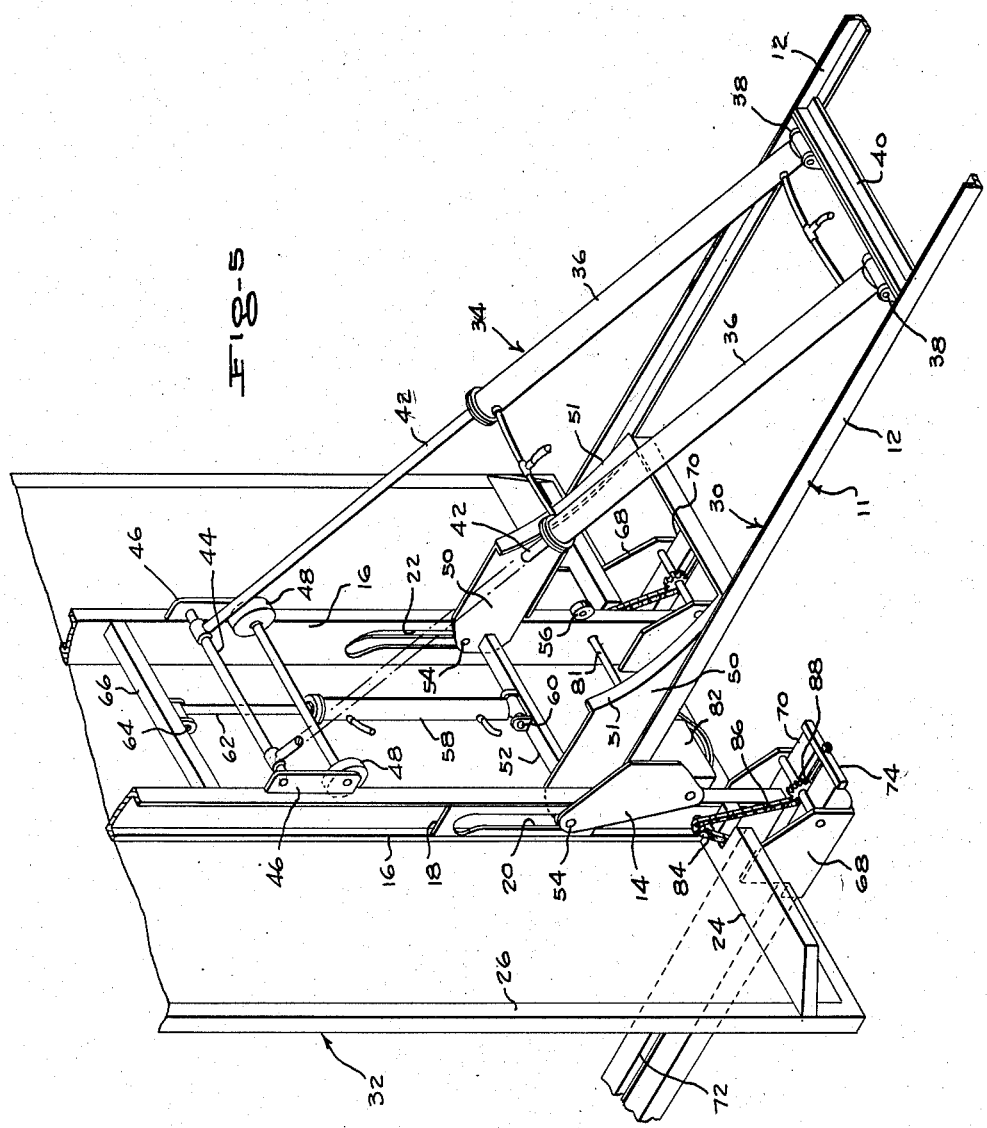

United States Patent Office
2,828,031
Patented Mar. 25, 1958

2,828,031

BALE LOADER AND STACKER

Wilber S. Babcock and George W. Babcock,
Lancaster, Calif.

Application March 9, 1956, Serial No. 570,466

2 Claims. (Cl. 214—146.5)

This invention relates to vehicle-mounted loading and stacking devices for bales of hay and the like, and more particularly represents an improvement over the structure shown in U. S. Patent No. 2,726,115, granted to us on Decamber 6, 1955.

In the mentioned patent, there is shown a structure adapted to be mounted upon a truck bed, and including a load support bed or platform swingably mounted upon the truck bed, for swinging movement between a first position in which the platform is horizontally disposed, and a second position in which it is vertically disposed beyond the rear end of the truck. In the first position, the device is adapted to serve as a conventional truck bed, whereby bales of hay and similar objects may be transported from place to place. When the platform is swung to its second position, the load is supported upon the ground, so that the truck may be pulled away, leaving the load in a stack upon the ground. Movement of the platform to the second position is also resorted to for the purpose of backing the truck up to a stack of bales, for engaging said stack with the swingable platform, after which the platform is returned to its horizontal, first position for transport of the load.

Further, in said patent, an assembly including slidable fingers or arms, shiftable in paths, and lying in planes, normal to the swingable platform, is carried by said platform. The arms are adapted to provide rear end stakes for the load during transport, and further, support the load during swinging of the platform from its horizontal to its vertical position, after which the arms are retractable for the purpose of disengaging the same from under the load.

The main object of the present invention is to provide a generally improved construction for a device of this type, retaining the desirable characteristics of the patented structure, including the swingable platform and the retractable arms. More specific objects are as follows:

First, to provide an improved mechanism for elevating and lowering the swinging bed;

Second, to provide an improved mechanism for retracting and extending the arms; and Third, but of an importance at least equal to the first two particular objects, to provide, in combination with the rest of the structure, stepped platform means on the swinging bed that serves to offset in a vertical direction different portions of the load, so that when the bed is swung to its vertical position, said portions will interfit with corresponding, previously unloaded portions to produce a tiered stack upon the ground that will prevent the stack from falling over.

Other objects will appear from the following description, the claims appended thereto, and from the annexed drawing, in which like reference characters designate like parts throughout the several views, and wherein:

Figure 2 is an end elevational view of the apparatus, the scale being enlarged above Figure 1, as seen from the left of Figure 1, portions of the arms being broken away and the platform being shown in its lowered position;

Figure 3 is a fragmentary side elevational view similar to Figure 1, in which the swinging bed has been swung to its vertical position for loading or unloading of the stacks;

Figure 4 is a top plan view of the apparatus, portions being broken away, in its loading or stacking position, as seen from the line 4—4 of Figure 3; and Figure 5 is a fragmentary perspective view of the apparatus with the bed elevated to its loading or stacking position.

Figure 1:
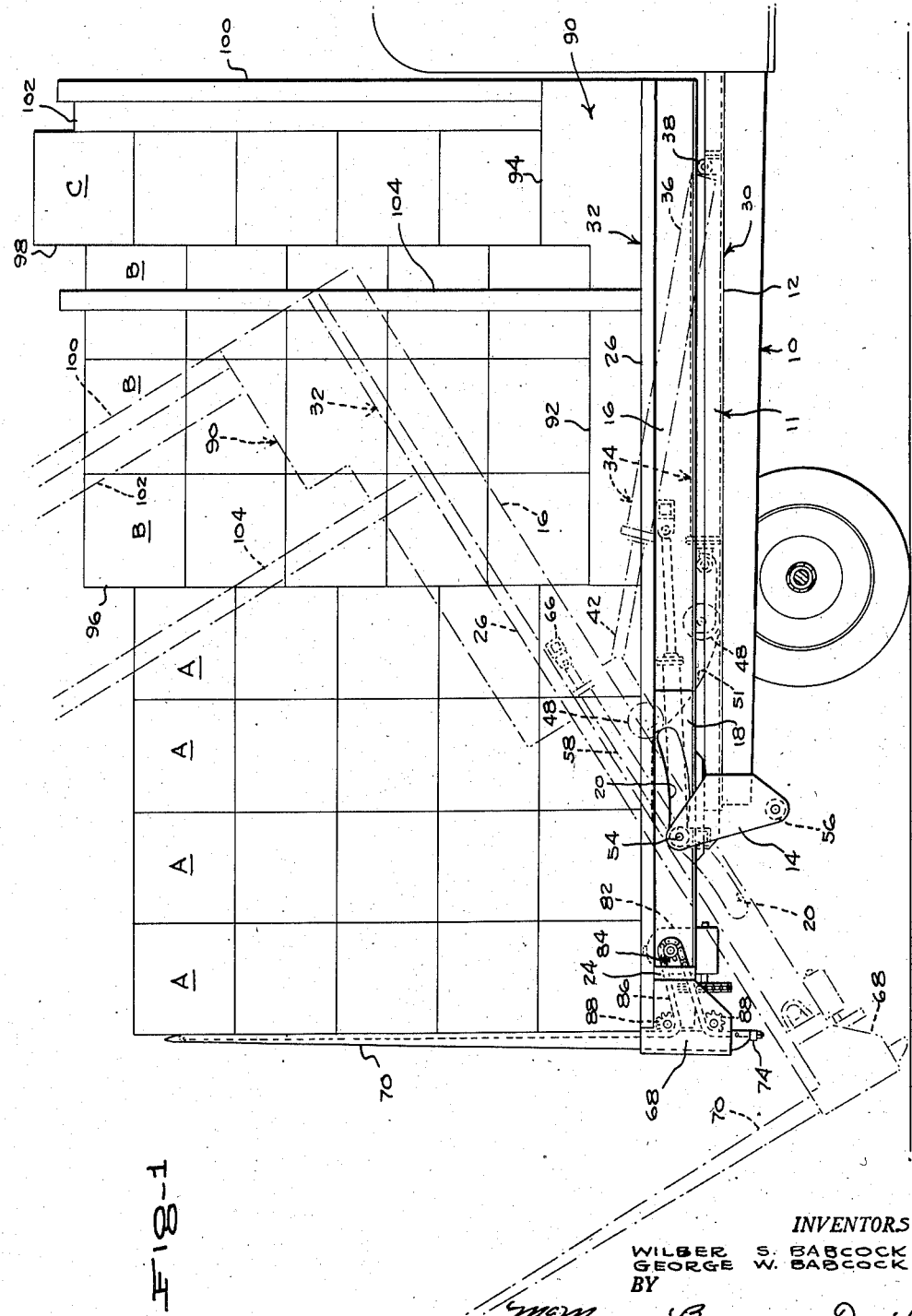
Figure 1 is a side elevational view of apparatus formed in accordance with the present invention, shown in full lines in its horizontal, load-transporting position, a load of bales being shown upon the apparatus in supported condition, the dotted lines showing the apparatus partially swung to its opposite extreme, loading or unloading position.

Referring to the drawings in detail, designated generally at 10 is a flat bed truck, and mounted upon the bed frame of the truck is the present invention, generally designated by the reference numeral 11. The invention includes a pair of elongated, straight, horizontally disposed side rails 12 offset inwardly from the opposite sides of the frame of the truck, and fixedly mounted upon said bed frame, the side rails extending for substantially the full length of the bed frame. Fixedly secured to the rear or outer ends of the side rails 12 are vertically disposed plates 14 which, as shown in Figures 3 and 5, have their upper and lower ends respectively projecting above and below the plane of the side rails 12.

Disposed adjacent the plates 14, at the inner sides of the plates, are elongated, channeled platform support rails 16, which, when the platform is lowered to its horizontal position, extends substantially in longitudinal contact with the side rails 12. The platform support rails, in the upwardly swung position of the platform shown in Figures 3 and 5, are disposed vertically, swinging on a pivot passing through the plates 14, in a manner to be described with greater particularity hereinafter. Welded or otherwise fixedly secured to the outer surfaces of the channeled support rails 16 are plates 18, formed with elongated slots 20 transversely aligned with slots 22 formed in the webs of the support rails 16. The slots 20, 22, at one end, have short, oblique extensions which, on movement of a pivot pin longitudinally of the slots, serve to ultimately offset the pivot pin transversely of each support rail 16, to properly locate the support rail as it swings to its vertical position.

Welded or otherwise fixedly secured to the rails 16, and projecting laterally, outwardly from said support rails, are flat, wide brace plates 24, bracing one end of and disposed transversely of a rectangular platform 26, the periphery of which is braced by channel members.

The stationary rails 12, together with the plates 14 and other stationary components to be described hereinafter, constitute what may appropriately be termed a support frame for the device generally designated at 30. The channeled rails 16, together with their associated platform, define a swinging load support bed, pivoted upon the support frame for swinging movement about a horizontal axis extending transversely of the support frame at the outer end thereof, said outer end being disposed slightly beyond the rear end of the truck 10.

Means 34 is provided for swinging the bed between its normal, horizontal position shown in full lines in Figure 1, and its loading or unloading position shown in Figures 4 and 5. Said means includes a pair of transversely spaced hydraulic cylinders 36, pivotally connected at 38 (Figure 5) to a cross bar 40 of the support frame 30, intermediate the opposite ends of the support frame. The cylinders swing about an axis paralleling that of the bed 32, and extending from the other ends of the cylinders are piston rods 42, pivotally connected at their outer ends to a cross bar 44 paralleling the designated axes. The cross bar 44 is fixedly connected between bracket plates 46 fixedly secured to the undersides of the side rails 16 intermediate opposite ends of the side rails, and rotatable upon the bracket plates adjacent the cross bar 44 are axle carrying rollers 48.

Rigid with the outer end portions of the support rails 12 are vertically disposed plates 51, lying against the inner surfaces of the rails 16. Thus, the rails swing into and out of the spaces between the plates 14, 50, when adjustment of the bed is effected between its horizontal and vertical positions.

At their inner ends, the plates 50 are formed with gently, inwardly curved, elongated ramps 51 merging at their lower ends into the surfaces of the inwardly projected flanges of the rails 12. Thus, the rails 12 constitute horizontal tracks on which the rollers 48 may roll, with said tracks being curved upwardly in the direction of the rear end of the apparatus through the medium of the curved ramp surfaces 51 and plates 50, so that said rollers may roll upwardly upon said curved surfaces.

Fixedly connected between the outer ends of the plates 50 is a horizontally disposed cross bar 52 also constituting a part of the support frame 30, said cross bar reinforcing the plates 50 in a transverse direction.

Pivot pins 54 are carried by the outer ends of the plates 50, and extend through the slots 20, 22, and also through the plates 14. The pivot pins 54 define the axis about which the bed swings between its horizontal and vertical positions, with said swinging movement being effected by extension and retraction of the piston rods 42.

Rotatably mounted upon the inner surfaces of the plates 14, at the lower end thereof, are rollers 56, the purpose of which will be presently made fully apparent.

Medially between the rails 16, there is provided a hydraulic cylinder 58, pivotally connected at one end as at 60 to the cross bar 52, for swinging movement about an axis paralleling the pivot axis of the bed 32. A piston rod 62 works in cylinder 58 and is pivotally connected at 64 to a cross bar 66 fixedly connected between the side rails 16 and constituting a part of the bed 32.

Fixedly secured to the reinforcing rails 24, and also constituting a part of the frame 32, are U-shaped guides 68, in which are slidably mounted elongated arms 70. The arms 70 slide within the guides in paths normal to the plane of the platform 32, and formed in the arms are elongated, longitudinally and centrally extending slots 72. The slots 72 are closed at one end of the arms by a cross bar 74, and said bars 74 are adapted to engage against the adjacent ends of the side walls of the guides or housings 68, to limit movement of the arms 70 to the left in Figures 3 and 5, that is, in a direction to extend the arms.

Means is mounted upon the bed to extend and retract the arms into load-engaging and disengaging positions respectively. This includes a motor 76 (Figure 2), preferably a hydraulic motor, mounted upon the bed adjacent the guides or housings 68. A small drive sprocket 78 is secured to the shaft of motor 76, and drives a chain 79 trained about a larger sprocket 80, secured to a shaft extending into a gear box 82 also secured to the bed 32. The gear box has therein conventional reduction gearing designed to effect the relatively slow extension and retraction of the arms 70 on operation of the motor, and extending from the gear box in opposite directions is a shaft 81, which projects at its opposite ends through bearings formed in the rails 16.

Secured to opposite ends of the shaft 81 are small sprockets 84, about which are trained chains 86 also trained about idler sprockets 88 rotatably mounted upon the walls of the guides 68 and spaced longitudinally of the slots 72 of the respective arms 70.

The chain 86, at its opposite ends, is connected at one end to the bar 74 and at the other end to the end wall of the slot 72.

The chain, thus, extends longitudinally within the respective slots 72 since chains are anchored to the arms 70 and in mesh with the sprockets 84, on operation of the hydraulic motor to rotate sprockets 84 in one direction the arms 70 will be extended to their load-engaging positions shown in Figures 1 and 5. On operation of the motor to rotate the sprockets 84 in opposite directions the arms will be retracted to the dotted line positions of Figure 3, to disengage from the load.

An important feature of the invention resides in the particular manner in which the bales are supported upon the bed. At the inner end of the bed, that is, the end remote from the arms 70 and disposed adjacent the cab of the truck during transport of the bales, there is provided, over the full width of the platform 26, an auxiliary platform generally designated 90. This extends for approximately half the length of the platform 26, and overlies the full area between the inner end of the platform 26 and the midlength portion thereof.

The auxiliary platform 90 includes an outer end portion 92 which is elevated above the plane of the load supporting surface of platform 26 a distance equal to approximately half the depth of a bale. The inner end portion 94, in turn, has its load-supporting surface elevated above that of the portion 92 a distance approximately half the depth of a bale.

That portion of the platform 26 which is not covered by the auxiliary platform 90 is of a length adapted to hold a predetermined number of vertical rows A of bales. In the illustrated example, four rows A may be supported upon this part of the platform 26. The portion 92 of platform 90 is slightly shorter, so as to support three rows of bales, the rows supported upon the portion 92 being designated by the reference letter B. The portion 94 is still shorter, and is adapted to support a single row C of bales.

Due to this arrangement, it will be seen that the invention includes a stepped bed, said bed being progressively stepped upwardly in the direction of the inner end of the bed as shown to best advantage in Figure 1.

The result is that when the bales are loaded onto the apparatus, and are supported for transport as in Figure 1, the upper end of the row C will be offset upwardly as at 98 from the plane of the top surfaces of the rows of bales B. Similarly, the upper ends of the rows B will be offset upwardly as at 96 above the planes of the top surfaces of the rows A.

By reason of this arrangement, when the bed is tilted from its horizontal to its vertical position, the bales will be supported upon the ground surface in an arrangement wherein the bales B will be staggered relative to the bales A (see Figures 3 and 4), with the bales C being in turn staggered relatively to the bales B. It will be readily appreciated that the bales will be thus supported in such a way as to resist the usual tendency of the same to fall over when they are stacked.

When bales of hay are stacked in a manner in which the tiered or staggered stacking system is not employed they tend to fall over. When staggering of the stacked bales is used, however, the stack remains stable. Due to the arrangement illustrated, when the load is shifted from its Figure 1 to its Figure 4 position, the rows A will abut against previously stacked rows A, the rows B will abut against previously stacked rows B, etc. Since the previously stacked rows are offset correspondingly to those shown in Figure 1, the newly unloaded bales will interfit with those previously stacked. Thus, successively dumped loads will interfit one with another producing, as an end result, a single, tiered stack.

To provide abutments in the sides and inner end of the load, stakes are secured to the apparatus. Thus, there are provided two stakes 100, one or both of which may have inwardly extending stops 102 adapted to engage the bales of the row C. Side stakes 104 are fixedly secured to the platform 26, and stakes 100, 104 will cooperate with the arms 70 in providing upon the truck a stake body during transport of the load.

In use of the apparatus, and assuming that the load or bales is to be dumped, means is operated from the cab of the vehicle to extend the piston rods 42. At the same time, fluid is supplied under pressure to the cylinder 58, to an end of the cylinder adapted for extending the piston rod 62.

Since the rams or rods 42 are extended simultaneously with the ram or rod 62, preferably by the same control valve, the smaller ram 62 will oppose the larger rams. Nevertheless, in actuality it will not interfere with extension of the rams 42, in view of its smaller size resulting in its being under less pressure than the rams 42. This causes a small power loss which, however, is not important.

As the rams 42 move out of their cylinders, the bed 32 will roll upon side rails 12, through the provision of rollers 48, toward the left in Figure 1. The pivot pins 54 will thus move along the slots 20. As soon as the movement of the bed begins, rollers 48 begin to climb ramps 51. When the rollers reach the tops of the ramps, the bed will be tilted out of the horizontal sufficiently to permit further extension of rams 42 to cause swinging movement of the bed about the pins 54 to the vertical position in Figures 3 and 4.

When the bed is vertically disposed, the smaller ram no longer opposes the larger rams, and thus as continued pressure is applied to the smaller ram, it will raise the bed above the ground so that the truck can be moved without dragging the bed upon the ground.

The smaller ram further acts as a snubber, to prevent the bed from making sudden movements within the slots 20, 22.

When the bed is vertically disposed as in Figure 3, the load will be supported upon the arms 70, which will now be horizontally disposed. Retraction of the arms is now effected by operation of hydraulic motor 76. When the arms have been fully retracted, the load will have been completely disengaged, and the truck may be driven away therefrom a distance sufficient for returning the bed to a horizontal position.

The apparatus is further adapted for loading bales upon the truck. With the parts positioned as in Figure 3, the truck is backed up to the load, and arms 70 are extended to engage under the load. Return of the bed to a horizontal position will now properly load the bales upon the truck for transport.

If desired, the auxiliary platform can be removably attached to platform 26, so that it may be readily taken off the platform, thereby permitting use of the truck as a conventional stake body vehicle.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. Bale loading and stacking apparatus for mounting on trucks and like vehicles, comprising a stationary support frame mountable upon a vehicle; a flat bed overlying the frame and hingedly connected to the frame to swing between horizontal, load-supporting and vertical, load-stacking positions; and an auxiliary platform supported upon the bed and formed in a series of steps, thus to offset selected portions of the load relative to the remaining portions, whereby, on swinging of the bed to its vertical position the several portions of the load will be stacked in a tiered arrangement, said auxiliary platform overlying substantially half the area of the bed, the auxiliary platform including a first end portion elevated above the plane of the bed and a second end portion elevated above the plane of the first portion.

2. Bale loading and stacking apparatus for mounting on trucks and like vehicles, comprising a stationary support frame mountable upon a vehicle; a flat bed overlying the frame and hingedly connected to the frame to swing between horizontal, load-supporting and vertical, load-stacking positions; and an auxiliary platform supported upon the bed and formed in a series of steps, thus to offset selected portions of the load relative to the remaining portions, whereby, on swinging of the bed to its vertical position the several portions of the load will be stacked in a tiered arrangement, said auxiliary platform overlying substantially half the area of the bed, the auxiliary platform including a first end portion elevated above the plane of the bed and a second end portion elevated above the plane of the first portion, the auxiliary platform having its first end portion elevated above the plane of the bed a distance substantially half the depth of a bale and the second end portion elevated above the plane of the first portion a further distance of substantially half a bale, whereby to offset bales supported upon the first end portion relative to said bales supported upon the part of the bed not covered by the auxiliary platform, in a staggered array, and whereby, further, to offset bales supported upon the second named end portions of the auxiliary platform in a staggered array relative to the bales supported upon the first named end portion.

References Cited in the file of this patent

UNITED STATES PATENTS

| | | |
|---|---|---|
| 1,586,808 | Hug | June 1, 1926 |
| 1,867,844 | Jungersen | July 19, 1932 |
| 2,598,865 | Turner | June 3, 1952 |
| 2,684,773 | Boyles | July 27, 1954 |
| 2,726,115 | Babcock et al. | Dec. 6, 1955 |